(12) United States Patent
Nagappan et al.

(10) Patent No.: US 8,769,155 B2
(45) Date of Patent: Jul. 1, 2014

(54) TECHNIQUES FOR SYNCHRONIZING APPLICATION OBJECT INSTANCES

(75) Inventors: Senthil Kumar Nagappan, Cupertino, CA (US); Hasnain Karampurwala, San Jose, CA (US); Reshma Sudarshan, Cupertino, CA (US); Mehul Dholakia, Cupertino, CA (US); Wing-Keung Adam Yeung, Pleasanton, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 337 days.

(21) Appl. No.: 12/823,073

(22) Filed: Jun. 24, 2010

(65) Prior Publication Data

US 2011/0231578 A1    Sep. 22, 2011

Related U.S. Application Data

(60) Provisional application No. 61/315,757, filed on Mar. 19, 2010.

(51) Int. Cl.
*G06F 15/16* (2006.01)
*G06F 17/30* (2006.01)
*H04L 12/56* (2006.01)
*H04L 29/08* (2006.01)

(52) U.S. Cl.
CPC ....... *G06F 17/30575* (2013.01); *H04L 67/1095* (2013.01); *H04L 45/586* (2013.01)
USPC .......................................... 709/248; 713/375

(58) Field of Classification Search
USPC .......................................... 709/248; 713/375
See application file for complete search history.

(56) References Cited

U.S. PATENT DOCUMENTS

| 5,159,592 A | 10/1992 | Perkins |
| 5,278,986 A | 1/1994 | Jourdenais et al. |
| 5,410,710 A | 4/1995 | Sarangdhar et al. |
| 5,550,816 A | 8/1996 | Hardwick et al. |
| 5,649,110 A | 7/1997 | Ben-Nun et al. |
| 5,878,232 A | 3/1999 | Marimuthu |
| 5,970,232 A | 10/1999 | Passint et al. |
| 5,978,578 A | 11/1999 | Azarya et al. |
| 6,047,330 A | 4/2000 | Stracke, Jr. |
| 6,097,718 A | 8/2000 | Bion |
| 6,101,188 A | 8/2000 | Sekine et al. |

(Continued)

FOREIGN PATENT DOCUMENTS

| EP | 0887731 A1 | 12/1998 |
| EP | 0926859 A | 6/1999 |

(Continued)

OTHER PUBLICATIONS

U.S. Appl. No. 09/703,057, filed Oct. 31, 2000, Brewer et al.

(Continued)

*Primary Examiner* — Jude Jean Gilles
*Assistant Examiner* — Jaren M Means
(74) *Attorney, Agent, or Firm* — Fountainhead Law Group, PC

(57) ABSTRACT

Techniques for synchronizing data object instances between applications/processes in an efficient manner. In one set of embodiments, the techniques described herein can be implemented in one or more network routers to synchronize data between a process running on an active management processor and a process running on a standby management processor, thereby facilitating features such as non-stop routing (NSR).

25 Claims, 6 Drawing Sheets

(56) References Cited

U.S. PATENT DOCUMENTS

| | | |
|---|---|---|
| 6,104,700 A | 8/2000 | Haddock et al. |
| 6,111,888 A | 8/2000 | Green et al. |
| 6,115,393 A | 9/2000 | Engel et al. |
| 6,161,169 A * | 12/2000 | Cheng .................. 711/150 |
| 6,233,236 B1 | 5/2001 | Nelson et al. |
| 6,282,678 B1 | 8/2001 | Snay et al. |
| 6,331,983 B1 | 12/2001 | Haggerty et al. |
| 6,374,292 B1 | 4/2002 | Srivastava et al. |
| 6,397,242 B1 | 5/2002 | Devine et al. |
| 6,424,629 B1 | 7/2002 | Rubino et al. |
| 6,430,609 B1 | 8/2002 | Dewhurst et al. |
| 6,496,510 B1 | 12/2002 | Tsukakoshi et al. |
| 6,496,847 B1 | 12/2002 | Bugnion et al. |
| 6,567,417 B2 | 5/2003 | Kalkunte et al. |
| 6,570,875 B1 | 5/2003 | Hegde |
| 6,577,634 B1 | 6/2003 | Tsukakoshi et al. |
| 6,580,727 B1 | 6/2003 | Yim et al. |
| 6,587,469 B1 | 7/2003 | Bragg |
| 6,597,699 B1 | 7/2003 | Ayres |
| 6,604,146 B1 | 8/2003 | Rempe et al. |
| 6,608,819 B1 | 8/2003 | Mitchem et al. |
| 6,633,916 B2 | 10/2003 | Kauffman |
| 6,636,895 B1 | 10/2003 | Li et al. |
| 6,674,756 B1 | 1/2004 | Rao et al. |
| 6,675,218 B1 | 1/2004 | Mahler et al. |
| 6,678,248 B1 | 1/2004 | Haddock et al. |
| 6,680,904 B1 | 1/2004 | Kaplan et al. |
| 6,691,146 B1 | 2/2004 | Armstrong et al. |
| 6,704,925 B1 | 3/2004 | Bugnion et al. |
| 6,711,672 B1 | 3/2004 | Agesen |
| 6,725,289 B1 | 4/2004 | Waldspurger et al. |
| 6,731,601 B1 | 5/2004 | Krishna et al. |
| 6,732,220 B2 | 5/2004 | Babaian et al. |
| 6,763,023 B1 | 7/2004 | Gleeson et al. |
| 6,785,886 B1 | 8/2004 | Lim et al. |
| 6,789,156 B1 | 9/2004 | Waldspurger |
| 6,791,980 B1 | 9/2004 | Li |
| 6,795,966 B1 | 9/2004 | Lim et al. |
| 6,847,638 B1 | 1/2005 | Wu |
| 6,859,438 B2 | 2/2005 | Haddock et al. |
| 6,880,022 B1 | 4/2005 | Waldspurger et al. |
| 6,898,189 B1 | 5/2005 | Di Benedetto et al. |
| 6,910,148 B1 * | 6/2005 | Ho et al. ................ 714/4.4 |
| 6,938,179 B2 | 8/2005 | Iyer et al. |
| 6,944,699 B1 | 9/2005 | Bugnion et al. |
| 6,961,806 B1 | 11/2005 | Agesen et al. |
| 6,961,941 B1 | 11/2005 | Nelson et al. |
| 6,975,587 B1 | 12/2005 | Adamski et al. |
| 6,975,639 B1 | 12/2005 | Hill et al. |
| 7,039,720 B2 | 5/2006 | Alfieri et al. |
| 7,058,010 B2 | 6/2006 | Chidambaran et al. |
| 7,061,858 B1 | 6/2006 | Di Benedetto et al. |
| 7,065,059 B1 | 6/2006 | Zinin |
| 7,093,160 B2 | 8/2006 | Lau et al. |
| 7,188,237 B2 | 3/2007 | Zhou et al. |
| 7,194,652 B2 | 3/2007 | Zhou et al. |
| 7,236,453 B2 | 6/2007 | Visser et al. |
| 7,269,133 B2 | 9/2007 | Lu et al. |
| 7,284,236 B2 | 10/2007 | Zhou et al. |
| 7,292,535 B2 | 11/2007 | Folkes et al. |
| 7,305,492 B2 | 12/2007 | Bryers et al. |
| 7,308,503 B2 | 12/2007 | Giraud et al. |
| 7,315,552 B2 | 1/2008 | Kalkunte et al. |
| 7,317,722 B2 | 1/2008 | Aquino et al. |
| 7,324,500 B1 | 1/2008 | Blackmon et al. |
| 7,327,671 B2 | 2/2008 | Karino et al. |
| 7,339,903 B2 | 3/2008 | O'Neill |
| 7,360,084 B1 | 4/2008 | Hardjono |
| 7,362,700 B2 | 4/2008 | Frick et al. |
| 7,382,736 B2 | 6/2008 | Mitchem et al. |
| 7,385,977 B2 | 6/2008 | Wu et al. |
| 7,406,037 B2 | 7/2008 | Okita |
| 7,417,947 B1 | 8/2008 | Marques et al. |
| 7,417,990 B2 | 8/2008 | Ikeda et al. |
| 7,418,439 B2 * | 8/2008 | Wong .................... 1/1 |
| 7,441,017 B2 | 10/2008 | Watson et al. |
| 7,447,225 B2 | 11/2008 | Windisch et al. |
| 7,483,370 B1 | 1/2009 | Dayal et al. |
| 7,483,433 B2 | 1/2009 | Simmons et al. |
| 7,518,986 B1 | 4/2009 | Chadalavada et al. |
| 7,522,521 B2 | 4/2009 | Bettink et al. |
| 7,535,826 B1 | 5/2009 | Cole et al. |
| 7,599,284 B1 | 10/2009 | Di Benedetto et al. |
| 7,609,617 B2 | 10/2009 | Appanna et al. |
| 7,620,953 B1 | 11/2009 | Tene et al. |
| 7,656,409 B2 | 2/2010 | Cool et al. |
| 7,694,298 B2 | 4/2010 | Goud et al. |
| 7,720,066 B2 | 5/2010 | Weyman et al. |
| 7,729,296 B1 | 6/2010 | Choudhary |
| 7,739,360 B2 | 6/2010 | Watson et al. |
| 7,751,311 B2 | 7/2010 | Ramaiah et al. |
| 7,787,360 B2 | 8/2010 | Windisch et al. |
| 7,787,365 B1 | 8/2010 | Marques et al. |
| 7,788,381 B2 | 8/2010 | Watson et al. |
| 7,802,073 B1 | 9/2010 | Cheng et al. |
| 7,804,769 B1 | 9/2010 | Tuplur et al. |
| 7,804,770 B2 | 9/2010 | Ng |
| 7,805,516 B2 | 9/2010 | Kettler et al. |
| 7,830,802 B2 | 11/2010 | Huang et al. |
| 7,843,920 B2 | 11/2010 | Karino et al. |
| 7,886,195 B2 | 2/2011 | Mayer |
| 7,894,334 B2 | 2/2011 | Wen et al. |
| 7,929,424 B2 | 4/2011 | Kochhar et al. |
| 7,940,650 B1 | 5/2011 | Sandhir et al. |
| 7,944,811 B2 | 5/2011 | Windisch et al. |
| 7,974,315 B2 | 7/2011 | Yan et al. |
| 8,009,671 B2 | 8/2011 | Guo et al. |
| 8,014,394 B2 | 9/2011 | Ram |
| 8,028,290 B2 | 9/2011 | Rymarczyk et al. |
| 8,074,110 B2 | 12/2011 | Vera et al. |
| 8,086,906 B2 | 12/2011 | Ritz et al. |
| 8,089,964 B2 | 1/2012 | Lo et al. |
| 8,095,691 B2 | 1/2012 | Verdoorn, Jr. et al. |
| 8,099,625 B1 | 1/2012 | Tseng et al. |
| 8,102,848 B1 | 1/2012 | Rao |
| 8,121,025 B2 | 2/2012 | Duan et al. |
| 8,131,833 B2 | 3/2012 | Hadas et al. |
| 8,149,691 B1 | 4/2012 | Chadalavada et al. |
| 8,156,230 B2 | 4/2012 | Bakke et al. |
| 8,161,260 B2 | 4/2012 | Srinivasan |
| 8,180,923 B2 | 5/2012 | Smith et al. |
| 8,181,174 B2 | 5/2012 | Liu |
| 8,291,430 B2 | 10/2012 | Anand et al. |
| 8,335,219 B2 | 12/2012 | Simmons et al. |
| 8,345,536 B1 | 1/2013 | Rao et al. |
| 2002/0035641 A1 | 3/2002 | Kurose et al. |
| 2002/0103921 A1 | 8/2002 | Nair et al. |
| 2002/0129166 A1 | 9/2002 | Baxter et al. |
| 2003/0105794 A1 | 6/2003 | Jasinschi et al. |
| 2003/0202520 A1 | 10/2003 | Witkowski et al. |
| 2004/0001485 A1 | 1/2004 | Frick et al. |
| 2004/0030766 A1 | 2/2004 | Witkowski |
| 2004/0078625 A1 | 4/2004 | Rampuria et al. |
| 2005/0036485 A1 | 2/2005 | Eilers et al. |
| 2005/0114846 A1 | 5/2005 | Banks et al. |
| 2005/0213498 A1 | 9/2005 | Appanna et al. |
| 2006/0002343 A1 | 1/2006 | Nain et al. |
| 2006/0004942 A1 | 1/2006 | Hetherington et al. |
| 2006/0018253 A1 | 1/2006 | Windisch et al. |
| 2006/0018333 A1 | 1/2006 | Windisch et al. |
| 2006/0090136 A1 | 4/2006 | Miller et al. |
| 2006/0143617 A1 | 6/2006 | Knauerhase et al. |
| 2006/0171404 A1 | 8/2006 | Nalawade et al. |
| 2006/0176804 A1 | 8/2006 | Shibata |
| 2006/0224826 A1 | 10/2006 | Arai et al. |
| 2006/0274649 A1 | 12/2006 | Scholl |
| 2007/0027976 A1 | 2/2007 | Sasame et al. |
| 2007/0036178 A1 | 2/2007 | Hares et al. |
| 2007/0076594 A1 | 4/2007 | Khan et al. |
| 2007/0162565 A1 | 7/2007 | Hanselmann |
| 2007/0189213 A1 | 8/2007 | Karino et al. |
| 2008/0022410 A1 | 1/2008 | Diehl |
| 2008/0068986 A1 | 3/2008 | Maranhao et al. |
| 2008/0120518 A1 | 5/2008 | Ritz et al. |

(56) References Cited

U.S. PATENT DOCUMENTS

| | | | |
|---|---|---|---|
| 2008/0159325 A1 | 7/2008 | Chen et al. | |
| 2008/0189468 A1 | 8/2008 | Schmidt et al. | |
| 2008/0201603 A1 | 8/2008 | Ritz et al. | |
| 2008/0222633 A1 | 9/2008 | Kami | |
| 2008/0225859 A1 | 9/2008 | Mitchem | |
| 2008/0243773 A1* | 10/2008 | Patel et al. | 707/2 |
| 2008/0244222 A1 | 10/2008 | Supalov et al. | |
| 2009/0028044 A1 | 1/2009 | Windisch et al. | |
| 2009/0036152 A1 | 2/2009 | Janneteau et al. | |
| 2009/0049537 A1 | 2/2009 | Chen et al. | |
| 2009/0080428 A1 | 3/2009 | Witkowski et al. | |
| 2009/0086622 A1 | 4/2009 | Ng | |
| 2009/0092135 A1 | 4/2009 | Simmons et al. | |
| 2009/0094481 A1 | 4/2009 | Vera et al. | |
| 2009/0106409 A1 | 4/2009 | Murata | |
| 2009/0198766 A1 | 8/2009 | Chen et al. | |
| 2009/0219807 A1 | 9/2009 | Wang | |
| 2009/0245248 A1 | 10/2009 | Arberg et al. | |
| 2009/0316573 A1 | 12/2009 | Lai | |
| 2010/0017643 A1 | 1/2010 | Baba et al. | |
| 2010/0039932 A1 | 2/2010 | Wen et al. | |
| 2010/0107162 A1 | 4/2010 | Edwards et al. | |
| 2010/0169253 A1 | 7/2010 | Tan | |
| 2010/0257269 A1 | 10/2010 | Clark | |
| 2010/0287548 A1 | 11/2010 | Zhou et al. | |
| 2010/0325381 A1 | 12/2010 | Heim | |
| 2010/0325485 A1 | 12/2010 | Kamath et al. | |
| 2011/0023028 A1 | 1/2011 | Nandagopal et al. | |
| 2011/0072327 A1* | 3/2011 | Schoppmeier et al. | 714/749 |
| 2011/0125949 A1 | 5/2011 | Mudigonda et al. | |
| 2011/0126196 A1 | 5/2011 | Cheung et al. | |
| 2011/0154331 A1 | 6/2011 | Ciano et al. | |
| 2011/0228770 A1 | 9/2011 | Dholakia et al. | |
| 2011/0228771 A1 | 9/2011 | Dholakia et al. | |
| 2011/0228772 A1 | 9/2011 | Dholakia et al. | |
| 2011/0228773 A1 | 9/2011 | Dholakia et al. | |
| 2012/0023309 A1 | 1/2012 | Abraham et al. | |
| 2012/0023319 A1 | 1/2012 | Chin et al. | |

FOREIGN PATENT DOCUMENTS

| | | | |
|---|---|---|---|
| EP | 1107511 | A2 | 6/2001 |
| EP | 2084605 | A2 | 8/2009 |
| WO | 2008054997 | A2 | 5/2008 |

OTHER PUBLICATIONS

U.S. Appl. No. 12/913,572, filed Oct. 27, 2010, Dholakia et al.
U.S. Appl. No. 12/913,598, filed Oct. 27, 2010, Dholakia et al.
U.S. Appl. No. 12/913,612, filed Oct. 27, 2010, Dholakia et al.
U.S. Appl. No. 12/913,650, filed Oct. 27, 2010, Dholakia et al.
Braden et al., "Integrated Services in the Internet Architecture: an Overview," Jul. 1994, RFC 1633, Network Working Group, pp. 1-28.
"Brocade Serveriron ADX 1000, 4000, and 8000 Series Frequently Asked Questions," pp. 1-10, Copyright 2009, Brocade Communications Systems, Inc.
Chen, "New Paradigm in Application Delivery Networking: Advanced Core Operating System (ACOS) and Multi-CPU Architecture—They Key to Achieving Availability, Scalability and Performance." White Paper, May 2009, A10 Networks, 5 pages.
Cisco IP Routing Handbook, Copyright 2000, pp. 22-23, 119-135, and 405-406, M&T Books.
Demers et al., "Analysis and Simulation of a Fair Queueing Algorithm," Xerox PARC, Copyright 1989, pp. 1-12, ACM.
*Extreme v. Enterasys WI Legal Transcript of Stephen R. Haddock*, May 7, 2008, vol. 2, 2 pages.
Floyd et al., "Link-sharing and Resource Management Models for Packet Networks," IEEE/ACM Transactions on Networking, Aug. 1995, vol. 3, No. 4, Copyright 1995, IEEE, pp. 1-22.
Freescale Semiconductor, Inc., "Freescale's Embedded Hypervisor for QorIQ™ P4 Series Communications Platform," White Paper, Oct. 2008, Copyright 2008, pp. 1-8, Document No. EMHYPQIQTP4CPWP, Rev. 1.
Freescale Semiconductor, Inc., "Embedded Multicore: An Introduction," Jul. 2009, Copyright 2009, 73 pages, Document No. EMBMCRM, Rev. 0.
"GIGAswitch FDDI System—Managers Guide," Part No. EK-GGMGA-MG.B01, Jun. 1993 first printing, Apr. 1995 second printing, Copyright 1995, Digital Equipment Corporation, Maynard, MA, 113 pages.
"GIGAswitch System—Managers Guide," Part No. EK-GGMGA-MG.A01, Jun. 1993, Copyright 1993, Digital Equipment Corporation, Maynard, MA, 237 pages.
Hemminger, "Delivering Advanced Application Acceleration & Security," Application Delivery Challenge, Jul. 2007, pp. 1-3.
Kaashoek et al., "An Efficient Reliable Broadcast Protocol" Operating System Review, Oct. 4, 1989, 15 pages.
Keshav, "An Engineering Approach to Computer Networking: ATM Networks; the internet, and the Telephone Network," Addison-Wesley Professional Computing Series, part 1 of 5, May 15, 1997, Copyright 1997 by AT&T, Addison-Wesley Publishing Company, pp. 1-129.
Keshav, "An Engineering Approach to Computer Networking: ATM Networks; the internet, and the Telephone Network," Addison-Wesley Professional Computing Series, part 2 of 5, May 15, 1997, Copyright 1997 by At&T, Addison-Wesley Publishing Company, pp. 130-260.
Keshav, "An Engineering Approach to Computer Networking: ATM Networks; the internet, and the Telephone Network," Addison-Wesley Professional Computing Series, part 3 of 5, May 15, 1997, Copyright 1997 by AT&T, Addison-Wesley Publishing Company, pp. 261-389.
Keshav, "An Engineering Approach to Computer Networking: ATM Networks; the internet, and the Telephone Network," Addison-Wesley Professional Computing Series, part 4 of 5, May 15, 1997, Copyright 1997 by AT&T, Addison-Wesley Publishing Company, pp. 390-519.
Keshav, "An Engineering Approach to Computer Networking: ATM Networks; the internet, and the Telephone Network," Addison-Wesley Professional Computing Series, part 5 of 5, May 15, 1997, Copyright 1997 by AT&T, Addison-Wesley Publishing Company, pp. 520-660.
May, et al., "An Experimental Implementation of Traffic Control for IP Networks," 1993, Sophia-Antipolis Cedex, France, 11 pages.
Moy, "OSPF Version 2," Network Working Group, RFC 2328, Apr. 1998, 204 pages.
Order Granting/Denying Request for Ex Parte Reexamination for U.S. Appl. No. 90/010,432, mailed on May 21, 2009, 18 pages.
Order Granting/Denying Request for Ex Parte Reexamination for U.S. Appl. No. 90/010,433, mailed on May 22, 2009, 15 pages.
Order Granting/Denying Request for Ex Parte Reexamination for U.S. Appl. No. 90/010,434, mailed on May 22, 2009, 20 pages.
Pangal, "Core Based Virtualization—Secure, Elastic and Deterministic Computing is Here . . . ," Blog Posting, May 26, 2009, 1 page, printed on Jul. 13, 2009, at URL: http://community.brocade.com/home/community/brocadeblogs/wingspan/blog/tags/serveri . . . .
Partridge, "A Proposed Flow Specification," Sep. 1992, RFC 1363, Network Working Group, pp. 1-20.
Riggsbee, "From ADC to Web Security, Serving the Online Community," Blog Posting, Jul. 2009, 2 pages, printed on Dec. 22, 2009, at URL: http://community.brocade.com/home/community/brocadeblogs/wingspan/blog/2009/07/0 . . . .
Riggsbee, "You've Been Warned, the Revolution Will Not Be Televised," Blog Posting, Jul. 2009, 2 pages, printed on Dec. 22, 2009, at URL: http://community.brocade.com/home/community/brocadeblogs/wingspan/blog/2009/07/0 . . . .
Schlansker, et al., "High-Performance Ethernet-Based Communications for Future Multi-Core Processors," SC07 Nov. 10-16, 2007, 12 pages, Copyright 2007, ACM.
TCP/IP Illustrated, vol. 2: The Implementation, Gray R. Wright and W. Richard Stevens, Addison-Wesley 1995, pp. 64, 97, 128,158,186,207,248,277,305,340,383,398,437,476,572,680,715, 756,797,1028, and 1051.

(56) References Cited

OTHER PUBLICATIONS

Wolf, et al., "Design Issues for High-Performance Active Routers," IEEE Journal on Selected Areas in Communications, IEEE, Inc. New York, USA, Mar. 2001, vol. 19, No. 3, Copyright 2001, IEEE, pp. 404-409.
European Search Report for Application No. EP 02254403, dated Mar. 18, 2003, 3 pages.
European Search Report for Application No. EP 02256444, dated Feb. 23, 2005, 3 pages.
Non-Final Office Action for U.S. Appl. No. 09/896,228, mailed on Jul. 29, 2005, 17 pages.
Non-Final Office Action for U.S. Appl. No. 09/896,228, mailed on Sep. 7, 2006, 17 pages.
Non-Final Office Action for U.S. Appl. No. 09/896,228, mailed on Mar. 5, 2007, 14 pages.
Final Office Action for U.S. Appl No. 09/896,228, mailed Aug. 21, 2007, 15 pages.
Notice of Allowance for U.S. Appl. No. 09/896,228, mailed on Jun. 17, 2008, 20 pages.
Non-Final Office Action for U.S. Appl. No. 09/953,714, mailed on Dec. 21, 2004, 16 pages.
Final Office Action for U.S. Appl. No. 09/953,714, mailed on Jun. 28, 2005, 17 pages.
Non-Final Office Action for U.S. Appl. No. 09/953,714, mailed on Jan. 26, 2006 15 pages.
Final Office Action for U.S. Appl. No. 09/953,714, mailed on Aug. 17, 2006, 17 pages.
Notice of Allowance for U.S. Appl. No. 09/953,714, mailed on Sep. 14, 2009, 6 pages.
Notice of Allowance for U.S. Appl. No. 09/953,714, mailed on Feb. 5, 2010, 10 pages.
Non-Final Office Action for U.S. Appl. No. 12/333,029, mailed on May 27, 2010, 29 pages.
Non-Final Office Action for U.S. Appl. No. 12/210,957, mailed on Sep. 2, 2009, 16 pages.
Notice of Allowance for U.S. Appl. No. 12/210,957, mailed on Feb. 4, 2010, 10 pages.
Non-Final Office Action for U.S. Appl. No. 12/333,029, mailed on Mar. 30, 2012, 15 pages.
Manolov, et al., "An Investigation into Multicasting, Proceedings of the 14th Annual Workshop on Architecture and System Design," (ProRISC2003), Veldhoven, The Netherlands, Nov. 2003, pp. 523-528.
Fenner, et al., "Protocol Independent Multicast—Sparse Mode (PIM-SM): Protocol Specification (Revised)." Network Working Group, RFC 4601, Aug. 2006, pp. 1-151.
Cisco Systems, Inc., "Graceful Restart, Non Stop Routing and IGP routing protocol timer Manipulation," Copyright 2008, pp. 1-4.
Cisco Systems, Inc., "Intermediate System-to-Intermediate System (IS-IS) Support for Graceful Restart (GR) and Non-Stop Routing (NSR)," Copyright 2008, pp. 1-3.
Cisco Systems, Inc., "Warm Reload," Cisco IOS Releases 12.3(2)T, 12.2(18)S, and 12.2(27)SBC, Copyright 2003, pp. 1-14.
Cisco Systems, Inc., "BGP Support for Nonstop Routing (NSR) with Stateful Switchover (SSO)." Mar. 20, 2006, pp. 1-18.
Cisco Systems, Inc., "Internet Protocol Multicast," Internetworking Technologies Handbook, 3rd Edition, Published 2000, Chapter 43, pp. 43-1 through 43-16.
Khan, "IP Routing Use Cases," Cisco Press, Sep. 22, 2009, pp. 1-16, at URL: http://www.ciscopress.com/articles/printerfriendly.asp?p=1395746.
Hardwick, "IP Multicast Explained," Metaswitch Networks, Jun. 2004, pp. 1-68.
Cisco Systems, Inc., "Multicast Quick—Start Configuration Guide," Document ID:9356, Copyright 2008-2009, 15 pages.
Lee, et al., "Open Shortest Path First (OSPF) Conformance and Performance Testing," White Papers, Ixia—Leader in Convergence IP Testing, Copyright 1998-2004, pp. 1-17.
Kaplan, "Part 3 in the Reliability Series: NSR™ Non-Stop Routing Technology," White Paper, Avici Systems, Copyright 2002, pp. 1-8.
Pepelnjak, et al., "Using Multicast Domains," informIT, Jun. 27, 2003, pp. 1-29, at URL: http://www.informit.com/articles/printerfriendly.aspx?p=32100.
Rodbell, "Protocol Independent Multicast—Sparse Mode," CommsDesign, Dec. 19, 2009, pp. 1-5, at URL: http://www.commsdesign.com/main/9811/9811standards.htm.
Product Category Brochure, "J Series, M Series and MX Series Routers—Juniper Networks Enterprise Routers—New Levels of Performance, Availability, Advanced Routing Features, and Operations Agility for Today's High-Performance Businesses," Juniper Networks, Nov. 2009, pp. 1-11.
IP Infusion Brochure, "ZebOS® Network Platform: Transporting You to Next Generation Networks," ip infusion™ An Access Company, Jun. 2008, pp. 1-6.
Kakadia, et al., "Enterprise Network Design Patterns: High Availability" Sun Microsystems, Inc., Sun BluePrints™ Online, Revision A, Nov. 26, 2003, pp. 1-35, at URL: http://www.sun.com/blueprints.
Non-Final Office Action for U.S. Appl. No. 12/626,432 mailed on Jul. 12, 2012, 13 pages.
Non-Final Office Action for U.S. Appl. No. 12/913,572 mailed on Aug. 3, 2012, 6 pages.
Notice of Allowance for U.S. Appl. No. 12/333,029 mailed on Aug. 17, 2012, 7 pages.
NonFinal Office Action for U.S. Appl. No. 12/842,945 mailed on Jun. 20, 2013, 14 pages.
Notice of Allowance for U.S. Appl. No. 12/913,598 mailed on Jul. 9, 2013, 6 pages.
Advisory Action for U.S. Appl. No. 12/626,432 mailed on Sep. 25, 2013, 4 pages.
Non-Final Office Action for U.S. Appl. No. 12/913,598 mailed on Sep. 6, 2012, 10 pages.
Non-Final Office Action for U.S. Appl. No. 12/913,612 mailed on Sep. 19, 2012, 11 pages.
Non-Final Office Action for U.S. Appl. No. 12/913,650 mailed on Oct. 2, 2012, 9 pages.
Notice of Allowance for U.S. Appl. No. 12/913,572 mailed on Nov. 21, 2012, 7 pages.
Non-Final Office Action for U.S. Appl. No. 12/842,936 mailed on Nov. 28, 2012, 12 pages.
Final Office Action for U.S. Appl. No. 12/823,073 mailed on Jan. 23, 2013, 23 pages.
Intel® Virtualization Technology, Product Brief, "Virtualization 2.0—Moving Beyond Consolidation", 2008, 4 pages.
VMware., "Automating High Availability (HA) Services With VMware HA", VMware Infrastructure, Copyright®1998-2006, 15 pages.
VMware, "Resource Management with Vmware DRS", VMware Infrastructure, Copyright® 1998-2006, 24 pages.
VMware, "Dynamic Balancing and Allocation of Resources for Virtual Machines", Product Datasheet, Copyright® 1998-2006, 2 pages.
Quickspecs, "HP Online VM Migration (for HP Integrity Virtual Machines)", Wordwide—Version 4, Sep. 27, 2010, 4 pages.
VMware, "Live Migration for Virtual Machines Without Service Interruption", Product Datasheet, Copyright® 2009 Vmware, Inc., 4 pages.
Burke, "Vmware Counters Oracle, Microsoft With Free Update", Nov. 13, 2007, 2 pages.
Final Office Action for U.S. Appl. No. 12/626,432 mailed on Apr. 12, 2013, 14 pages.
Notice of Allowance for U.S. Appl. No. 12/913,598 mailed on Mar. 12, 2013, 5 pages.
Notice of Allowance for U.S. Appl. No. 12/913,650 mailed on Mar. 25, 2013, 6 pages.
Notice of Allowance for U.S. Appl. No. 12/842,936 mailed on Apr. 8, 2013, 6 pages.

\* cited by examiner

TECHNIQUES FOR SYNCHRONIZING APPLICATION OBJECT INSTANCES

CROSS-REFERENCES TO RELATED APPLICATIONS

The present application claims the benefit and priority under 35 U.S.C. 119(e) of U.S. Provisional Application No. 61/315,757, filed Mar. 19, 2010 entitled "TECHNIQUES FOR SYNCHRONIZING APPLICATION OBJECT INSTANCES," the entire contents of which are incorporated herein by reference for all purposes.

BACKGROUND

Embodiments of the present invention relate in general to data synchronization, and in particular to techniques for efficiently synchronizing data object instances between applications/processes.

Data synchronization refers to the process of keeping multiple copies of a dataset in coherence with each other. Data synchronization techniques are commonly used in a variety of different computing scenarios that require consistency between redundant/replicated data stores, such as multi-level cache architectures, distributed filesystems, high-availability database clusters, and the like.

In the field of computer networking, data synchronization techniques can be used to facilitate non-stop routing (NSR). Generally speaking, NSR enables a network router to gracefully handle the failure of an active management processor (active MP) within the router by failing over to a standby management processor (standby MP), without disrupting routing protocol interactions with other routers and without dropping any packets (known as hitless failover). NSR also allows for software upgrades to be performed on an active MP in the same hitless fashion.

To implement NSR, a router typically maintains data structures in a memory accessible by a standby MP that replicate data structures (e.g., routing table, neighbor database, etc.) used by a process running on an active MP in carrying out routing functions. Thus, if the active MP fails, the standby MP can automatically access the information it needs (via the replicated data structures) to take over routing functions in a seamless manner. As part of this implementation, data synchronization techniques are needed to ensure that the respective data accessible by the active and standby MPs remain in sync with each other. For example, while the active MP is available, the process running on the active MP can receive messages from other routers (e.g., link state advertisements, etc.) that require changes to its routing information. These changes need to be replicated in a consistent manner to the standby MP so that the standby has the most up-to-date routing data (in case of a subsequent failure in the active MP).

Unfortunately, existing data synchronization techniques have a number of limitations that limit their usefulness in this (and other similar) contexts. Merely by way of example, existing data synchronization techniques generally require creating an intermediate copy of the data to be synchronized in the memory accessible by the active MP, thereby consuming memory resources and decreasing performance. As another example, existing data synchronization techniques cannot easily support synchronization of different types of data objects (as may be needed for supporting NSR with respect to different routing protocols).

BRIEF SUMMARY

Embodiments of the present invention provide a framework (referred to herein as "sync library") for synchronizing data object instances between applications/processes in an efficient manner. In one set of embodiments, the sync library can be implemented in one or more network routers to synchronize data between a process running on an active MP (e.g., the master application) and a process running on a standby MP (e.g., the slave application), thereby facilitating features such as non-stop routing (NSR).

In one embodiment, the sync library can synchronize data between a master application and a slave application without creating a temporary copy of the data. In another embodiment, the sync library 114 can support parallel synchronization of different types of data objects (e.g., link state advertisements, multicast cache entries, etc.). In another embodiment, the sync library can enable the master application to check the synchronization status, and receive an indication of a successful end-to-end synchronization, for each data object instance. In another embodiment, the sync library can allow the master and slave applications to define functions for packing and unpacking data into synchronization buffers (e.g., inter-process communication, or IPC, buffers) used to transmit data to the slave application. In another embodiment, the sync library can support multiple, virtual synchronization instances. In another embodiment, the sync library can perform baseline synchronization in the event that the slave application is unavailable for a period of time and is restarted.

According to one embodiment of the present invention, a method is provided that comprises synchronizing, by a network device, a data object instance between a first application running on a first processor of the network device and a second application executing on a second processor. In certain embodiments, the data object instance is resident in a first memory accessible by the first processor, and the synchronizing does not require a copy of the data object instance to be created in the first memory.

In one embodiment, the synchronizing causes the data object instance to be replicated in a second memory accessible by the second processor.

In one embodiment, the second processor and the second memory are resident on another network device.

In one embodiment, the synchronizing comprises, if the second processor is available, adding the data object instance to a first linked list, the first linked list including data object instances of the first application that are intended to be sent to the second application, and invoking a first function for packing the data object instance into a synchronization buffer.

In one embodiment, the synchronization buffer is an inter-process communication (IPC) buffer.

In one embodiment, the first function is a callback function that is registered by the first application.

In one embodiment, the synchronizing further comprises, if the second processor is available, transmitting the synchronization buffer to the second application, and invoking a second function for unpacking the data object instance from the synchronization buffer.

In one embodiment, the second function is a callback function that is registered by the second application.

In one embodiment, the synchronizing further comprises, if the second processor is available, moving the data object instance from the first linked list to a second linked list, the second linked list including data object instances of the first application that have been sent to the second application but have not yet been acknowledged as being received.

In one embodiment, the synchronizing further comprises, if the second processor is available, determining whether an acknowledgment is received from the second application within a predetermined time interval, the acknowledgement indicating that the data object instance has been received by the second application.

In one embodiment, the synchronizing further comprises, if the second processor is available and if the acknowledgement is received within the predetermined time interval, invoking a third function for notifying the first application that synchronization of the data object instance is successful, and moving the data object instance to a third linked list, the third linked list including data object instances of the first application that have been sent to the second application and acknowledged.

In one embodiment, the synchronizing further comprises, if the second processor is available and if the acknowledgement is not received within the predetermined time interval, moving the data object instance to the end of the first linked list.

In one embodiment, the predetermined time interval is configurable.

In one embodiment, the synchronizing further comprises, if the second processor is unavailable, adding the data object instance to the third linked list, and invoking the third function.

In one embodiment, the synchronizing further comprises, once the second processor becomes available, moving the data object instance from the third linked list to a fourth linked list, the fourth linked list including data object instances of the first application that are intended to be sent to the second application in a bulk fashion.

In one embodiment, the network device is a network router, the first processor is an active management processor, and the second processor is a standby management processor.

In one embodiment, the data object instance includes routing data used by a routing protocol.

According to another embodiment of the present invention, a network device is provided. The network device comprises a first processor configured to perform management functions of the network device and a first memory accessible by the first processor. In certain embodiments, the network device is configured to synchronize data between the first processor and a second processor, where the second processor is communicatively coupled with a second memory, where the synchronizing comprising replicating a data object instance from the first memory to the second memory, and where the synchronizing does not require a copy of the data object instance to be created in the first memory.

In one embodiment, the second processor and the second memory are resident on another network device.

In one embodiment, the synchronizing further comprises synchronizing a plurality of data object instances between the first processor and the second processor in a single synchronization transaction.

In one embodiment, the network device is a network router, the first processor is an active management processor, and the second processor is a standby management processor.

In one embodiment, the first and second processors are configured to execute a plurality of virtual routing protocol instances, and the network device is configured to synchronize data between the first processor and the second processor for each virtual routing protocol instance.

According to another embodiment, a computer-readable storage medium having stored thereon program code executable by a first processor of a network device is provided. The program code comprises code that causes the first processor to synchronizing a data object instance between a first application executing on the first processor and a second application executing on a second processor, where the data object instance is resident in a first memory accessible by the first processor, and where the synchronizing does not require a copy of the data object instance to be created in the first memory.

A further understanding of the nature and advantages of the embodiments disclosed herein can be realized by reference to the remaining portions of the specification and the attached drawings.

DETAILED DESCRIPTION

In the following description, for the purposes of explanation, specific details are set forth in order to provide a thorough understanding of embodiments of the invention. However, it will be apparent that the invention may be practiced without these specific details.

Embodiments of the present invention provide a framework (referred to herein as "sync library") for synchronizing data object instances between applications/processes in an efficient manner. In one set of embodiments, the sync library can be implemented in one or more network routers to synchronize data between a process running on an active MP (e.g., the master application) and a process running on a standby MP (e.g., the slave application), thereby facilitating features such as non-stop routing (NSR).

In certain embodiments, the sync library can be implemented as a set of application programming interfaces (APIs). As described in further detail below, these APIs can be invoked by the master and/or slave application to initiate and carry out the synchronization process.

Figure 1:
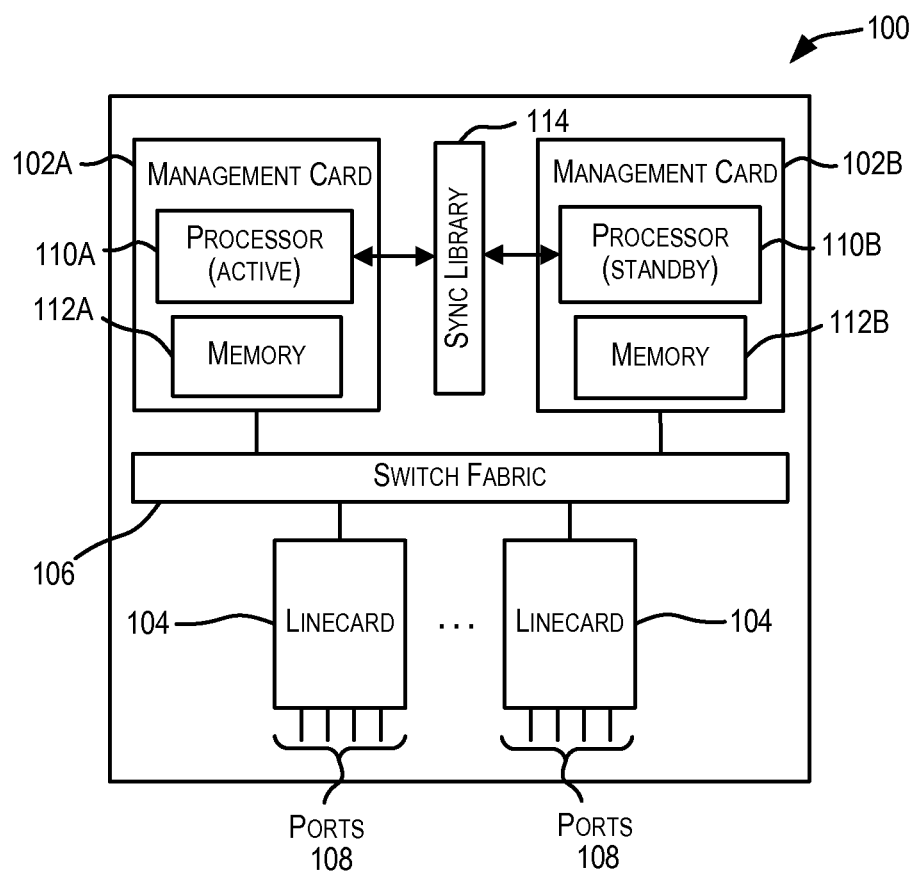
FIG. 1 is a simplified block diagram of a network router in accordance with an embodiment of the present invention.

FIG. 1 is a simplified block diagram of a network router 100 in accordance with an embodiment of the present invention. Router 100 can be configured to receive and forward data packets to facilitate delivery of the data packets to their intended destinations. In one set of embodiments, router 100 can be a router provided by Brocade Communications Systems, Inc.

As shown in the embodiment of FIG. 1, router 100 can include one or more management cards 102A, 102B and one or more linecards 104 coupled via a switch fabric 106. Each management card/linecard 102A, 102B, 104 can be inserted into (or removed from) one of a plurality of modular slots in the chassis of router 100. Accordingly, router 100 can accommodate any number of management cards and linecards as needed for different network topologies and different switching/routing requirements. It should be appreciated that the particular configuration depicted in FIG. 1 is meant for illustrative purposes only and is not intended to limit the scope of the present invention. For example, alternative embodiments can have more or less components than those shown in FIG. 1.

Generally speaking, linecards 104 represent the data forwarding plane of router 100. Each linecard 104 can include one or more input/output ports 108 that are used by router 100 to send and receive data packets. Ports 108 can send and/or receive various types of data traffic at different speeds including 1 Gigabit/sec, 10 Gigabits/sec, or more. In some embodiments, multiple ports 108 can be logically grouped into one or more trunks.

Management cards 102A, 102B represent the control plane of router 100. Each management card can include a management processor (MP) (e.g., 110A, 110B) that executes management and/or control functions of router 100. In one set of embodiments, the MP can be a general purpose microprocessor, such as a PowerPC, Intel, AMD, or ARM microprocessor, that operates under the control of software stored in a computer-readable storage medium (e.g., RAM, ROM, etc.). For example, the computer-readable storage medium can store program code which, when executed by MP 110A or 110B, carries out the various data synchronization techniques described herein.

In one set of embodiments, management cards 102A, 102B can support non-stop routing (NSR) with respect to one or more routing protocols/functions (e.g., Open Shortest Path First (OSPF), Intermediate System to Intermediate System (IS-IS), Border Gateway Protocol (BGP), multicast tree management, etc.). In these embodiments, MP 110A of management card 102A (referred to as the active MP) can operate in an active mode and carry out the routing control functions of router 100. MP 110B of management card 102B (referred to as the standby MP) can operate in a standby, or waiting, mode. When a failure (or some other event, such as a software upgrade) causes MP 110A to become deactivated or otherwise unavailable, router 100 can automatically fail over control plane functionality from MP 110A to MP 110B, without disrupting routing control interactions with other routers and without dropping any packets (referred to as a hitless failover). Once the failover is complete, MP 110B can become the new active MP and MP 110A can become a standby MP.

As part of this NSR implementation, management card 102A can maintain routing data in a memory 112A is that used by active MP 110A in executing routing control functions, and management card 102B can maintain a synchronized copy of the routing data in a memory 112B that is accessible by standby MP 110B. Examples of such routing data can include, e.g., link state advertisements received from peer routers, a neighbor database, and the like. With this mirrored configuration, when a failover occurs from active MP 110A to standby MP 110B, MP 110B can automatically access the information it needs (via memory 112B) to take over the routing functions of MP 110A in a seamless manner.

To ensure that the routing data stored in memory 112A remains in sync with the routing data stored in memory 112B, router 100 can make use of a sync library 114. In various embodiments, sync library 114 can provide a set of synchronization data structures and APIs that enable a process running on active MP 110A (referred to herein as the master application) to synchronize data object instances with a corresponding process running on standby MP 110B (referred to herein as the slave application). In this manner, any changes to the routing data in memory 112A can be replicated in a consistent manner to memory 112B.

In certain embodiments, sync library 114 can provide a number of advantages over existing data synchronization techniques. For instance, sync library 114 is not limited to synchronizing specific types of data, and can be used to synchronize any type of data structure that may be used by the master and slave applications (e.g., in the case OSPF, sync library 114 can be used to synchronize LSAs and neighbor information; in the case of Multicast, sync library 114 can be used to synchronize multicast cache entries; and so on).

In addition, sync library 114 can minimize memory overhead by avoiding making intermediary copies of the data to be synchronized. For example, sync library can synchronize data from memory 112A to memory 112B without creating an intermediate or temporary copy of the data in memory 112A. Rather, sync library 114 can operate directly on the data object instances instantiated by the master application in memory 112A.

In addition, sync library 114 can enable the master application to check the synchronization status, and receive an indication of a successful end-to-end synchronization, for each data object instance being synchronized.

In addition, sync library 114 can allow the master and slave applications to define functions for packing and unpacking data into the synchronization buffers (e.g., IPC buffers) used to transmit data to the slave application. This enables sync library 114 to support the synchronization of different data object types, since the logic for packing/unpacking a particular data object type is provided by the master and/or slave applications (rather than being handled by the sync library). This also allows for parallel synchronization of different data object types, since the master/slave applications can specify a different pack/unpack function for each data structure type.

In addition, the sync library can support multiple, virtual synchronization instances. This can be useful, for example, if MPs 110A and 110B each support the parallel execution of multiple, virtual routing protocol instances (e.g., multiple OSPF instances). In this case, a separate synchronization instance can be created and maintained for each routing protocol instance.

In addition, sync library 114 can perform baseline synchronization in the event that the slave application is down for a period of time. For example, if standby MP 110B is unavailable, sync library 114 can queue all of the routing data updates received from the process running on active MP 110A. Once the standby MP 110B become available again, sync library 114 can automatically synchronize all of the data object instances in the queue so that routing data 112B is brought up to the same baseline state as routing data 112A.

It should be appreciated that FIG. 1 is illustrative and not intended to limit embodiments of the present invention. For example, network router 100 can have other capabilities or include other components that are not specifically described. In a particular embodiment, management cards 102A, 102B (and thus, MPs 110A, 110B and memories 112A, 112B) can be resident in different network routers, such that routing data is synchronized across routers (rather than within a single router). One of ordinary skill in the art will recognize many variations, modifications, and alternatives.

Figure 2:
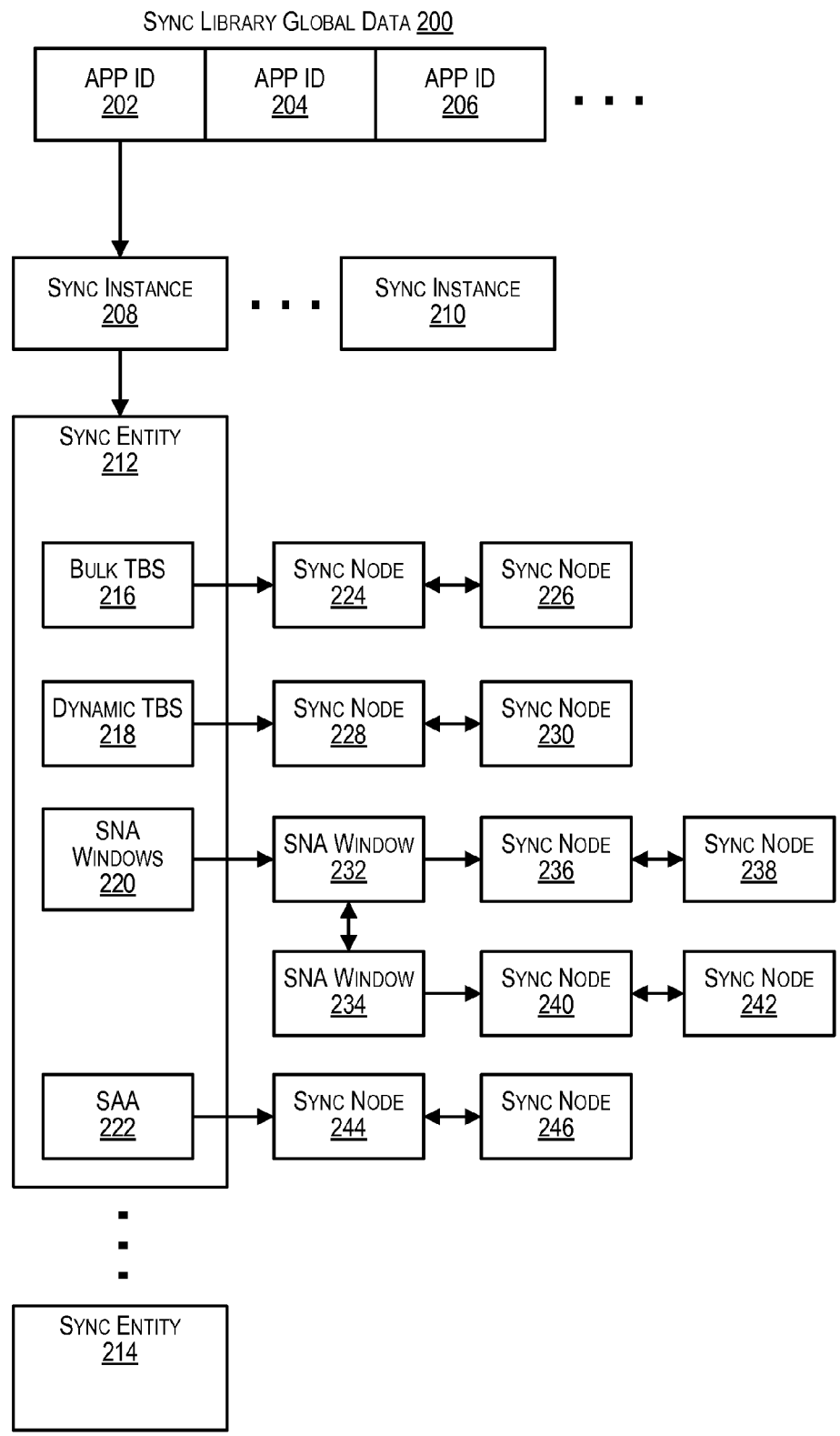
FIG. 2 is a simplified block diagram illustrating synchronization data structures that can be created by the sync library in accordance with an embodiment of the present invention.

FIG. 2 is a simplified block diagram illustrating synchronization data structures that can be created by sync library 114 in accordance with an embodiment of the present invention. In a particular embodiment, these data structures can be created in memory 112A of MP 110A (the active MP) when sync library 114 is in use by router 100.

As shown, FIG. 2 includes a sync library global data array 200 that specifies one more application IDs 202, 204, 206. In various embodiments, array 200 can be created when sync library 114 is first initialized, and each array index 202, 204, 206 can correspond to an identifier of an application that is using the sync library. For example, if a process running on active MP 110A of FIG. 1 initializes sync library 114, array index 202 can correspond the application ID for that process.

Each array value for array 200 can point to a linked list of sync instances (e.g., 208, 210). This linked list can identify all of the sync instances currently being used by the application specified by the corresponding array index. As described above, an application can be composed of multiple virtual instances, each of which require synchronization services. Accordingly, a separate sync instance can be created for each virtual application instance. Although only two sync instances are shown for app ID 202, any number of sync instances can be created.

Each sync instance (e.g., 208) can point to a linked list of sync entities (e.g., 212, 214). In one set of embodiments, a sync entity can maintain synchronization information for a specific type of data object. For example, a process running on active MP 110A may want to synchronize link state advertisements (LSAs), as well neighbor database updates, with standby MP 110B. In this case, a separate link entity can by created for the LSA data type and the neighbor data type. Since each link entity can maintain its own synchronization state, this allows different types of data objects to be synchronized in parallel for a given application.

In one set of embodiments, each sync entity (e.g., 212) can include pointers to four different types of linked lists: bulk TBS (To Be Sent) 216, dynamic TBS 218, SNA (Sent but Not Acknowledged) windows 220, and SAA (Sent And Acknowledged) 222. Each of these linked lists can comprise sync nodes (e.g., 224, 226, 228, 230, 236, 238, 240, 242, 244, 246) that correspond to data object instances that need to be (or have been) synched between the master and slave application. Using these lists, sync library 114 can keep track of, for example, which data object instances need to be sent (synchronized) to the slave application, which instances have been sent but not acknowledged, and which instances have been sent and acknowledged. The logic for populating and removing nodes from each of these lists is discussed in greater detail with respect to FIGS. 4-6 below.

In one set of embodiments, the sync nodes pointed to via lists 216, 218, 220, and 222 can directly correspond to the data object instances created by the master application. Thus, sync library 114 does not need to create a temporary or working copy of the data object instances for synchronization purposes; rather, sync library 114 can operate directly on the instances used by the master application.

Figure 3:
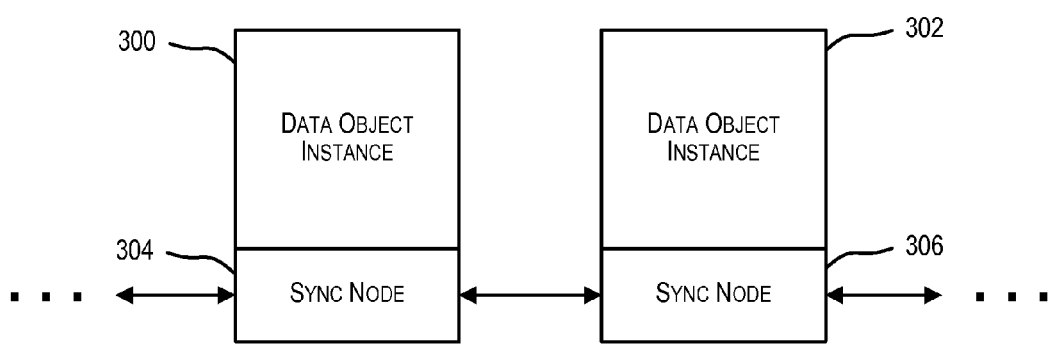
FIG. 3 is a simplified block diagram illustrating a data object instance maintained by a master application in accordance with an embodiment of the present invention.

FIG. 3 is a simplified block diagram illustrating data object instances 300 and 302 used by a master application according to an embodiment of the present invention. Instances 300 and 302 can correspond to, for example, LSAs maintained in memory 112A by active MP 110A. As shown, instances 300 and 302 can be instantiated by the master application with memory portions (304, 306) pre-allocated for the sync node pointers used by sync library 114. When sync nodes are moved between the various lists managed by sync library 114, the library is actually acting on the data object instances created by the master application (and stored in memory 112A). Thus, synch library 114 does not require a temporary copy of the data object instances to be created in memory 112A for synchronization purposes.

In certain embodiments, sync library 114 can send a plurality of data object instances from the master application to the slave application in a single transaction via a synchronization buffer (e.g., an IPC buffer). In these embodiments, SNA Windows 220 can point to a number of sub-lists that each have an SNA Window head node (232, 234). These sub-lists can be used to keep track of the data object instances that are sent to the slave application in a single buffer.

Figure 4:
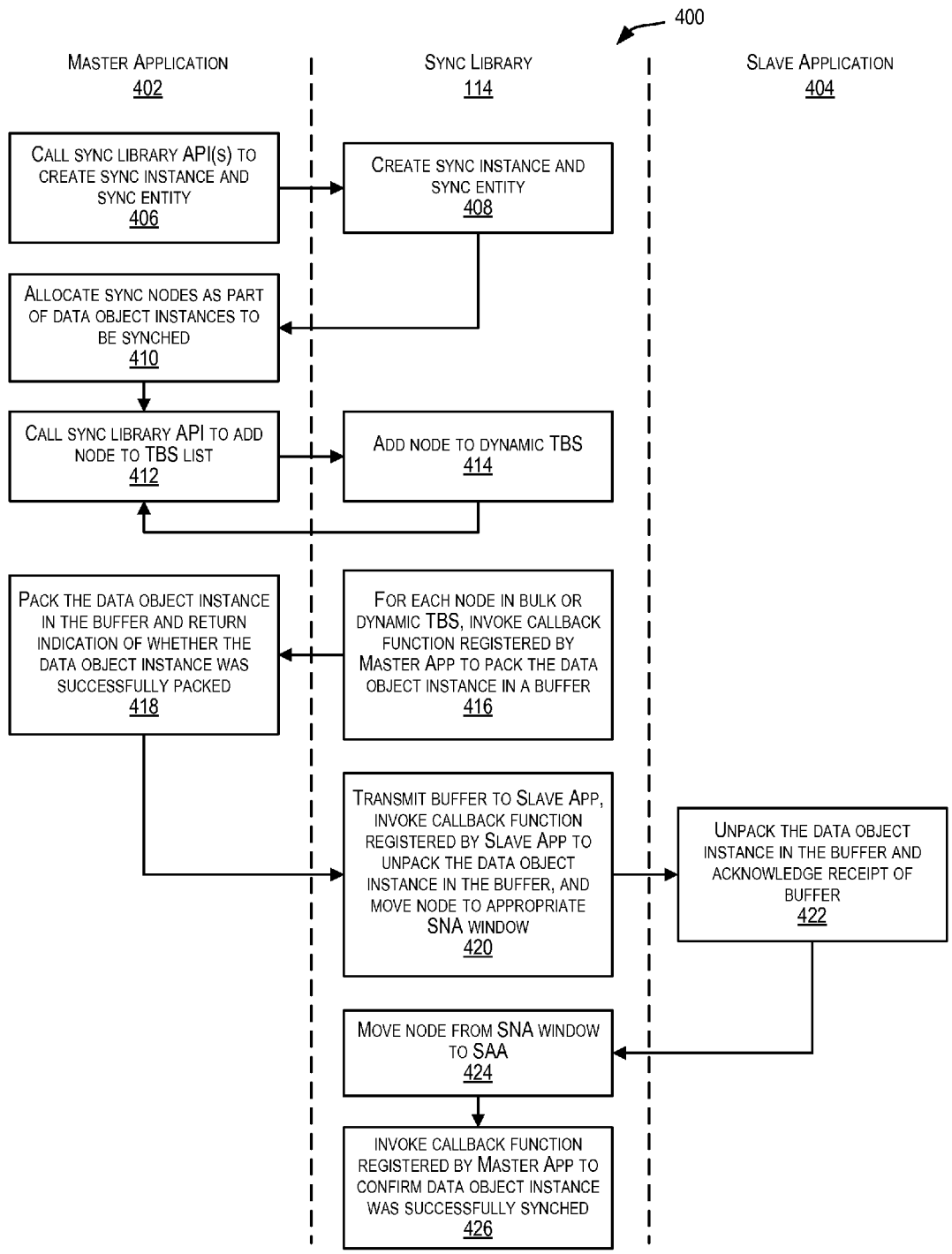
FIG. 4 is a flow diagram of a process for synchronizing data object instances in accordance with an embodiment of the present invention.

FIG. 4 is a flow diagram of a process 400 for synchronizing data object instances between a master application 402 and a slave application 404 using sync library 114 according to an embodiment of the present invention. In one set of embodiments, master application 402 can correspond to a process running on active MP 110A of FIG. 1 and slave application 404 can correspond to a process running on standby MP 110B of FIG. 1. Process 400 can be implemented in software, hardware, or a combination thereof. As software, process 400 can be encoded as program code stored on a computer-readable storage medium.

At block 406, master application 402 can call one or more sync library APIs to create a sync instance and a sync entity for synchronizing data with slave application 404. For example, master application 402 can create a sync instance for an OSPF routing protocol running on active MP 110A and can create a sync entity for syncing LSAs. In response to block 406, sync library 114 can instantiate the sync instance and sync entity data structures as described with respect to FIG. 2 (block 408).

At block 410, master application 402 can instantiate data object instances that are used by the application. The data object instances can include, for example, routing data for facilitating routing via a particular protocol (e.g., OSPF, IS-IS, BGP, etc.). As part of this process, master application 402 can allocate, for each data object instance, a memory portion for storing a sync node pointer used by sync library 114. This enables sync library 114 to directly access these data object instances when building the TBS, SNA, and SAA lists.

Figure 5:
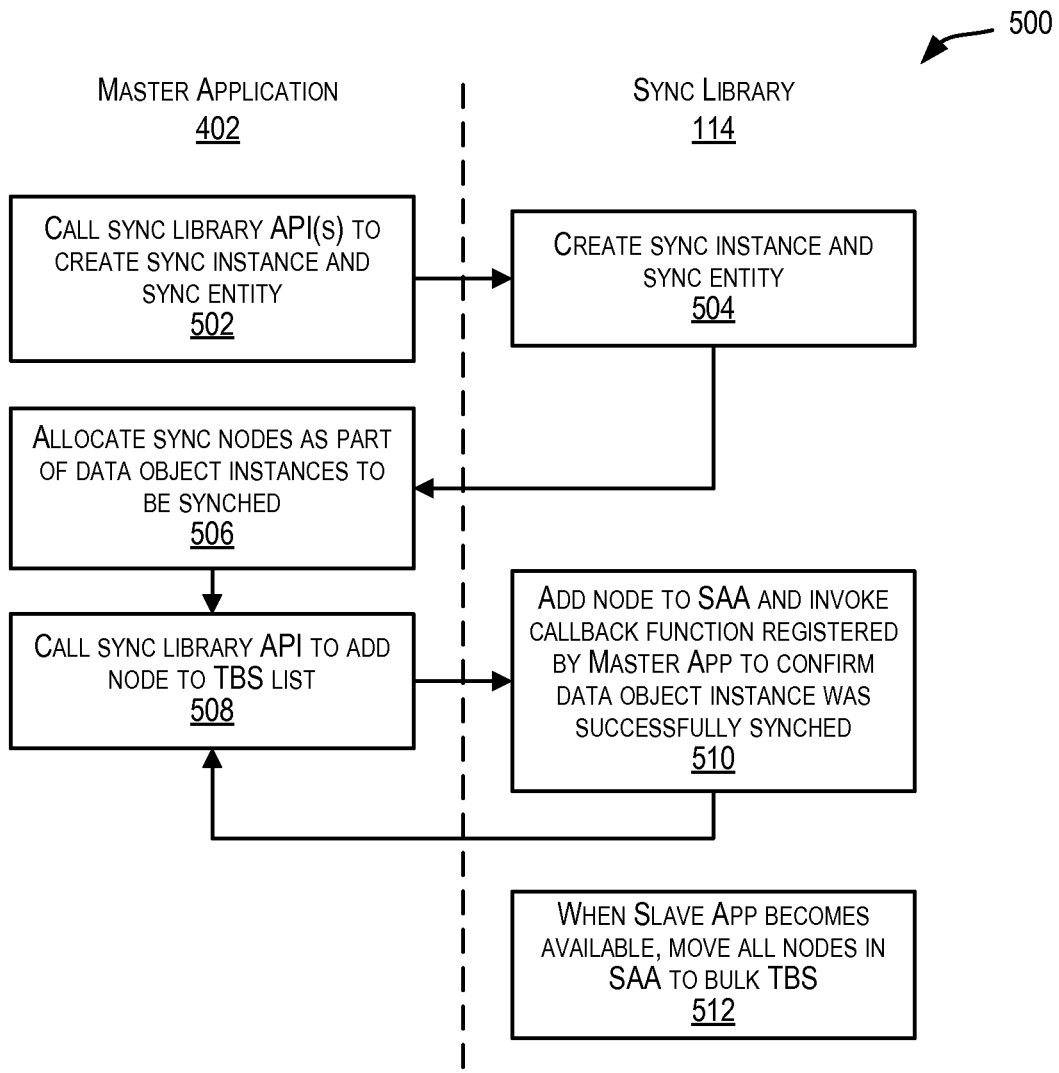
FIG. 5 is a flow diagram of another process for synchronizing data object instances in accordance with an embodiment of the present invention.

At block 412, master application 402 can call a sync library API that specifies a particular data object instance to be synched. In response, sync library API can add the sync node correspond to the specified data object instance to dynamic TBS 218 of FIG. 2 (block 414) (for the purposes of process 400, it is assumed that the standby processor on which slave application 404 is running (e.g., MP 110B) is available; process 500 of FIG. 5 illustrates an alternative process that is performed when the standby processor is not available). Blocks 412 and 414 can be repeated any number of times to add additional sync nodes to the dynamic TBS list.

At blocks 416-420, sync library 114 can initiate synchronization of the sync nodes/data object instances added to the dynamic (and bulk) TBS lists. In one set of embodiments, the processing of blocks 416-420 can be automatically initiated at a recurring time interval that is specified by master application 402. In another set of embodiments, this processing can be initiated by a specific command received from master application 402.

At block 416, sync library 114 can invoke a callback function (i.e., a pack function) registered by the master application to pack the data object instance for the sync node into an synchronization buffer. As part of this invocation, sync library 114 can pass (as a parameter to the function) a pointer to the start of the buffer. At block 418, master application 402 can execute the pack function (e.g., pack the data object instance for the sync node into the buffer) and provide an indication to sync library 114 whether the packing was successful. If the packing was successful, sync library 114 can transmit the buffer to slave application 404, invoke a callback function (i.e., an unpack function) registered by slave application 404 to unpack the instance in the buffer, and move the sync node to an appropriate SNA window sub-list (block 420). In one set of embodiments, the particular SNA window sub-list that the node is moved to can correspond to the buffer that was used to transmit the instance.

At block 422, slave application 404 can unpack the data object instance from the buffer (in response to the invocation of the unpack function at block 420) and copy it to memory 112B of FIG. 1. Slave application 404 can then acknowledge receipt of the entire buffer to sync library 114. Once the acknowledgment is received, sync library can move all of the sync nodes in the SNA window sub-list corresponding to the buffer to the SAA list (block 424). In this manner, the nodes in the buffer can be identified as being both synchronized and acknowledged.

Figure 6:
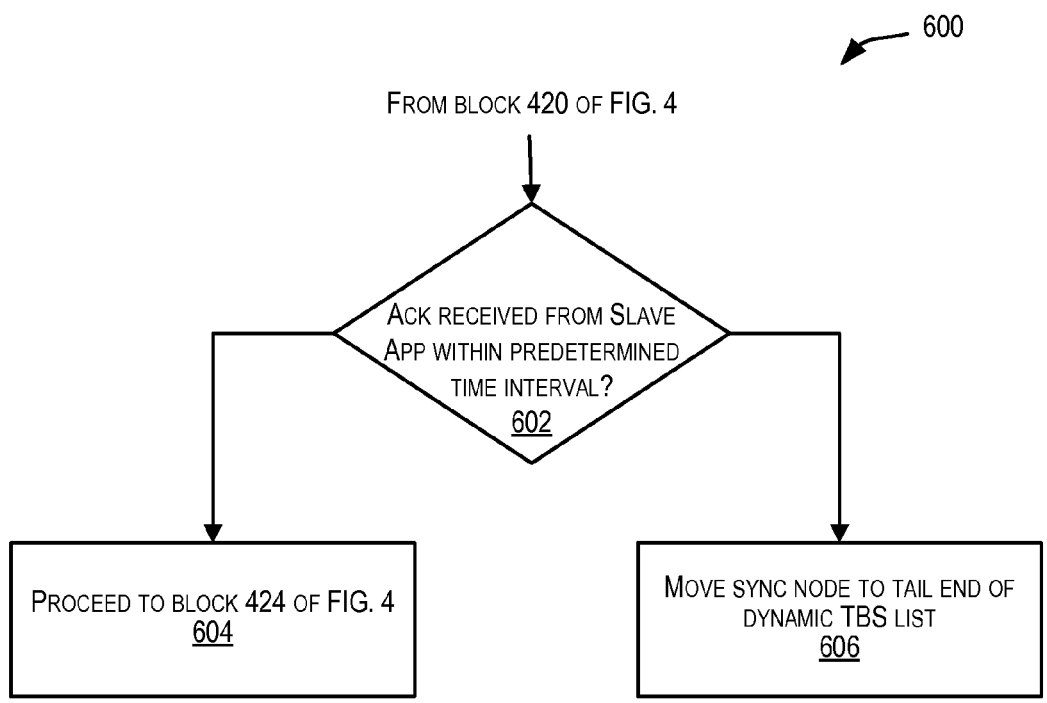
FIG. 6 is a flow diagram of a process for retransmitting un-acknowledged data object instances in accordance with an embodiment of the present invention.

In some cases, sync library 114 may not receive an acknowledgement from slave application 404 for a long period of time (or at all). To address these situations, FIG. 6 illustrates a process 600 in which sync library 114 can determine whether an acknowledgement has been received from slave application 404 within a predetermined period of time (block 602). If an acknowledgement is received within this time frame, processing can proceed to block 424 of FIG. 4 (block 604). If an acknowledgement is not received within this time frame, sync library 114 can automatically move the sync nodes in the SNA window sub-list to the tail end of the dynamic TBS list (block 606). Accordingly, those nodes can be retransmitted. In a particular embodiment, the predetermined time period can be configurable.

Returning to FIG. 4, at block 426 sync library can invoke a callback function (i.e., an acknowledgement function) registered by master application 402 to inform the master that the data object instance(s) were successfully synched.

It should be appreciated that process 400 is illustrative and that variations and modifications are possible. Steps described as sequential may be executed in parallel, order of steps may be varied, and steps may be modified, combined, added, or omitted. One of ordinary skill in the art would recognize other variations, modifications, and alternatives.

As described above, process 400 of FIG. 4 assumes that the standby MP (e.g., MP 110B) on which slave application 404 is running is available. FIG. 5 is a flow diagram of a process 500 illustrating steps performed by master application 402 and sync library 114 when the standby MP is not available. Process 500 can be implemented in software, hardware, or a combination thereof. As software, process 500 can be encoded as program code stored on a computer-readable storage medium.

The processing performed at blocks 502-508 is substantially similar to blocks 406-412 of process 400. At block 510, upon receiving a command to synchronize a particular sync node (i.e., add the sync node to the TBS list), sync library 114 can add the node to the SAA list and immediately invoke the callback function indicating that the synchronization was acknowledged by the slave. In this embodiment, master application 402 does not receive any indication that the slave is unavailable, and believes that the synchronization of the instance completed successfully. This can be repeated any number of times while the standby MP is unavailable and while master application 402 requests additional nodes to be synched.

When the standby MP (and thus slave application 404) becomes available (e.g., is restarted), sync library 114 can move all of the nodes in the SAA list to the bulk TBS list (block 512). The nodes in the bulk TBS list can then be synchronized, in parallel with new sync nodes added to the dynamic TBS list, as part of the processing of FIG. 4. In this manner, slave application 404 can be made consistent with master application 402, without any intervention on the part of the master. While this bulk synchronization is occurring, any new nodes (i.e., nodes not already in the bulk TBS list) can be added to the dynamic TBS list. If an update is received for a node that is already in the bulk TBS list, that node can be moved from the bulk TBS list to the dynamic TBS list.

In certain embodiments, when a node in the bulk TBS list is sent to slave application 404 and acknowledged by the slave, the sync library will not invoke the callback acknowledgement function described at block 426 (since the synchronization of that node was already acknowledged at block 512 of FIG. 5).

If the standby MP becomes unavailable during the execution of process 400, all of the nodes in the TBS and SNA lists can be moved to the SAA list. These nodes can then be moved to the bulk TBS list when the standby MP becomes available again.

It should be appreciated that process 500 is illustrative and that variations and modifications are possible. Steps described as sequential may be executed in parallel, order of steps may be varied, and steps may be modified, combined, added, or omitted. One of ordinary skill in the art would recognize other variations, modifications, and alternatives.

Although specific embodiments of the invention have been described, various modifications, alterations, alternative constructions, and equivalents are also encompassed within the scope of the invention. For example, in one set of embodiments, the synchronization techniques described above can be used to synchronize application object instances between a master application running on an active management processor and a slave application running on a standby management processor, where the active and standby processors reside in different network devices. In these embodiments, sync library 114 can use some form of inter-machine communication, such as a socket-based buffer or API, rather than an IPC buffer to synchronize data between the remote processors. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method comprising:
   instantiating, by a first application running on an active processor of a network device, a data object instance in a first memory accessible by the active processor, the data object instance having a first type;
   invoking, by the first application, a command to synchronize the data object instance to a second memory accessible by a standby processor; and
   in response to the invoking, moving, by the active processor, the data object instance to a first portion of a memory structure in the first memory, wherein the first portion of the memory structure comprises data object instances not yet synchronized to the second memory, and wherein the first portion of the memory structure is specific to the first application and the first type.

2. The method of claim 1 wherein the synchronizing causes the data object instance to be replicated in the second memory.

3. The method of claim 2 wherein the standby processor and the second memory are resident on another network device.

4. The method of claim 1 wherein the first portion of the memory structure is a linked list.

5. The method of claim 4 further comprising invoking, by the first application, a first function for packing the data object instance into a synchronization buffer.

6. The method of claim 5 wherein the synchronization buffer is an inter-process communication (IPC) buffer.

7. The method of claim 5 wherein the first function is a callback function that is registered by the first application.

8. The method of claim 5 further comprising, if the standby processor is available: transmitting the synchronization buffer to a second application running on the standby processor, wherein the second application invokes a second function for unpacking the data object instance from the synchronization buffer.

9. The method of claim 8 wherein the second function is a callback function that is registered by the second application.

10. The method of claim 8 further comprising, subsequently to the transmitting, moving the data object instance from the first portion of the memory structure to a second portion of the memory structure, the second portion of the memory structure including data object instances of the first application that have been sent to the second application but have not yet been acknowledged as being received.

11. The method of claim 10 further comprising determining whether an acknowledgement is received from the second application within a predetermined time interval, the acknowledgement indicating that the data object instance has been received by the second application.

12. The method of claim 11 further comprising, if the acknowledgement is received within the predetermined time interval:
invoking a third function for notifying the first application that synchronization of the data object instance is successful.

13. The method of claim 12 further comprising moving the data object instance to a third portion of the memory structure, the third portion of the memory structure including data object instances of the first application that have been sent to the second application and acknowledged.

14. The method of claim 12 further comprising, if the acknowledgement is not received within the predetermined time interval, moving the data object instance to the end of the first portion of the memory structure.

15. The method of claim 13 further comprising, if the standby processor is unavailable: adding the data object instance to the third portion of the memory structure; and invoking the third function.

16. The method of claim 15 further comprising, once the standby processor becomes available, moving the data object instance from the third portion of the memory structure to a fourth portion of the memory structure, the fourth portion of the memory structure including data object instances of the first application that are intended to be sent to the second application in a bulk fashion.

17. The method of claim 11 wherein the predetermined time interval is configurable.

18. The method of claim 1 wherein the data object instance includes routing data used by a routing protocol.

19. The method of claim 1 wherein the first memory and the second memory are non-persistent memories.

20. A network device comprising:
an active processor for performing management functions of the network device;
a first memory accessible by the active processor; and
a non-transitory computer readable medium having stored thereon program code that, when executed by the active processor, causes the active processor to:
instantiate, via a first application running on the active processor, a first data object instance in the first memory, the first data object instance having a first type;
invoke a command to synchronize the first data object instance to a second memory accessible by a standby processor; and
in response to the invoking, move the first data object instance to a first portion of a memory structure in the first memory, wherein the first portion of the memory structure comprises data object instances not yet synchronized to the second memory, and wherein the first portion of the memory structure is specific to the first application and the first type.

21. The network device of claim 20 wherein the standby processor and the second memory are resident in another network device.

22. The network device of claim 20 further comprising synchronizing the data object instances between the active processor and the standby processor in a single synchronization transaction.

23. The network device of claim 20 wherein the program code further causes the active processor to:
instantiate, via a second application running on the active processor, a second data object instance in the first memory, the second data object instance having a second type that is distinct from the first type;
invoke a command to synchronize the second data object instance to the second memory; and
in response to the invoking, move the second data object instance to a second portion of the memory structure in the first memory, wherein the second portion of the memory structure is specific to the second application and the second type.

24. The network device of claim 23 wherein the first and second applications correspond to first and second routing protocol instances.

25. A non-transitory computer-readable storage medium having stored thereon program code executable by a network device, the program code comprising:
code that causes an application running on an active processor of the network device to instantiate a data object instance in a first memory accessible by the active processor, the data object instance having a first type;
code that cause the application to invoke a command to synchronize the data object instance to a second memory accessible by a standby processor; and
code that causes the active processor to, in response to the invoking, move the data object instance to a first portion of a memory structure in the first memory, wherein the first portion of the memory structure comprises data object instances not yet synchronized to the second memory, and wherein the first portion of the memory structure is specific to the application and the first type.

* * * * *